(12) United States Patent
Suzuki et al.

(10) Patent No.: US 6,222,545 B1
(45) Date of Patent: *Apr. 24, 2001

(54) IMAGE PROCESSING APPARATUS AND METHOD

(75) Inventors: Yasumichi Suzuki; Mitsuru Kurita; Toshiyuki Kitamura, all of Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/621,994

(22) Filed: Mar. 26, 1996

(30) Foreign Application Priority Data

Mar. 28, 1995 (JP) .................................................. 7-069384
Jul. 18, 1995 (JP) .................................................. 7-181332

(51) Int. Cl.[7] ........................................................ G06F 15/00
(52) U.S. Cl. .................................................................. 345/418
(58) Field of Search ..................................... 395/133, 139; 345/418, 419, 433, 428

(56) References Cited

U.S. PATENT DOCUMENTS

| 4,635,212 | * | 1/1987 | Hatazawa | 345/437 |
| 4,816,925 | * | 3/1989 | Hayashi | 345/437 |
| 5,581,796 | * | 12/1996 | Koga et al. | 395/133 |

* cited by examiner

Primary Examiner—Phu K. Nguyen
(74) Attorney, Agent, or Firm—Fitzpatrick, Cella, Harper & Scinto

(57) ABSTRACT

An image processing apparatus capable of displaying a preview image which has close resemblance to an original image or an edited image automatically applies image processes, such as magnification/compression, rotation, and displacement, to the preview image on the basis of the size of an image and the size of a display screen. Image size information and a reference position mark are displayed after being synthesized. A preview image is thus displayed which may easily be checked by an operator.

15 Claims, 16 Drawing Sheets

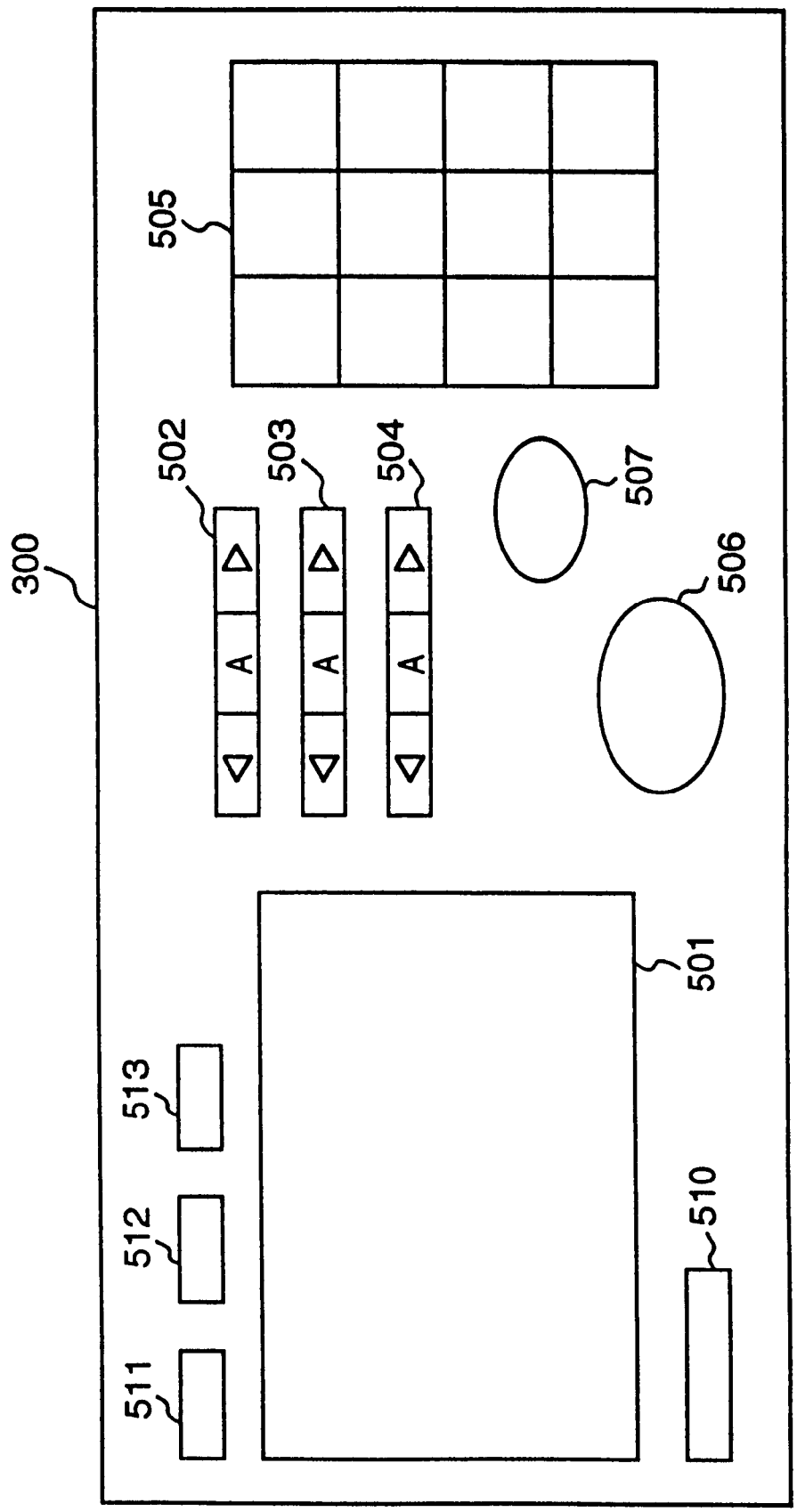

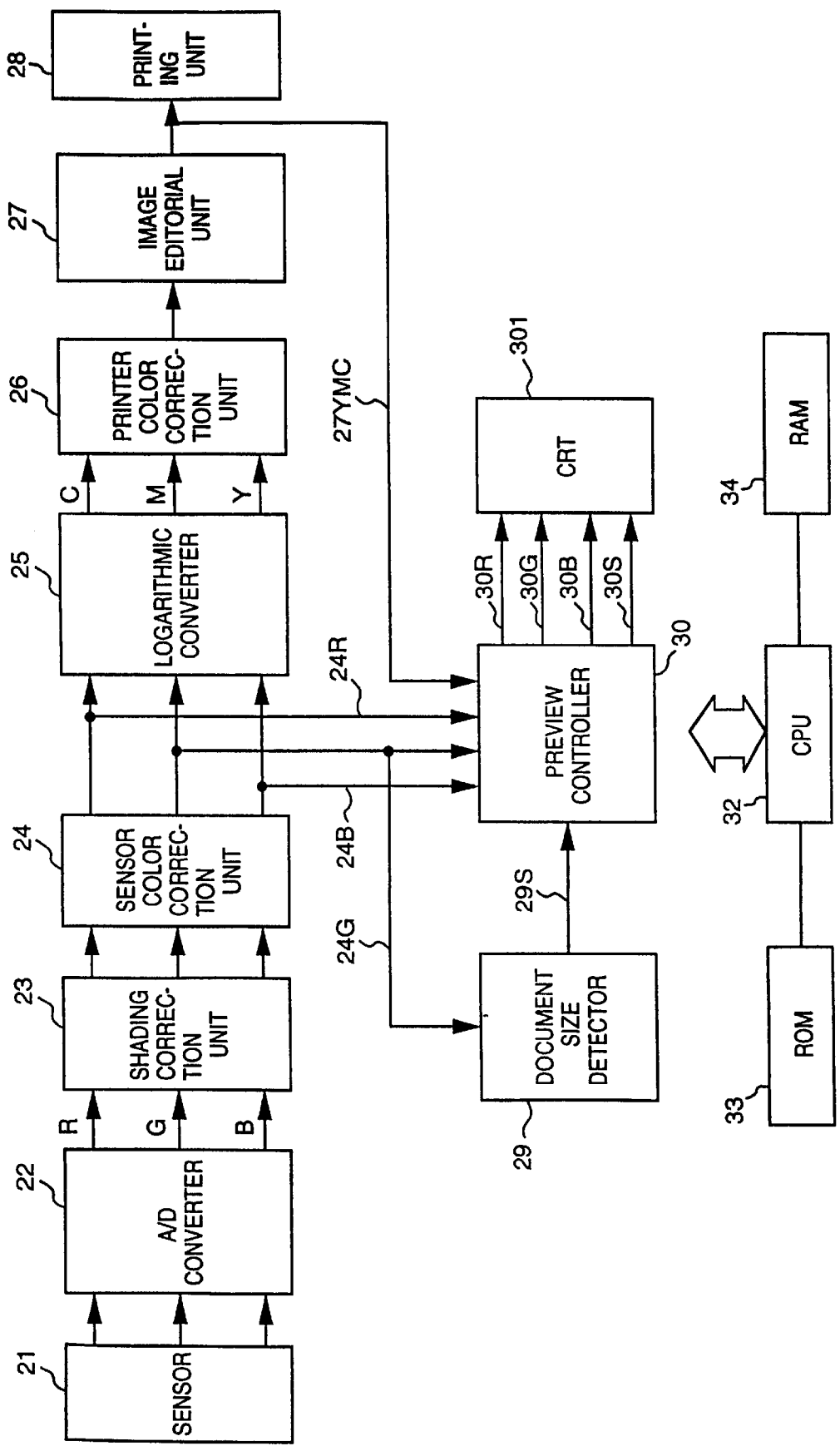

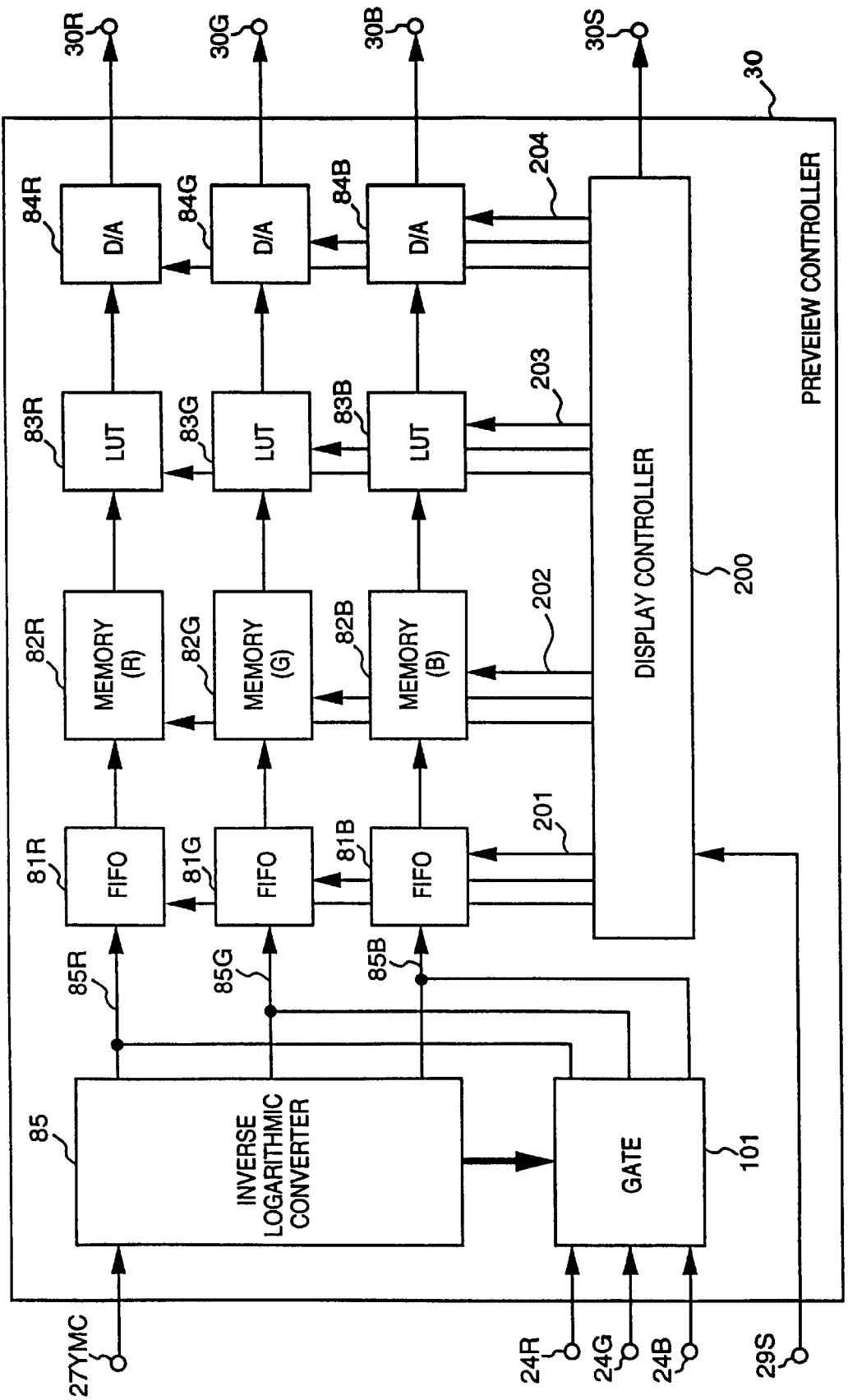

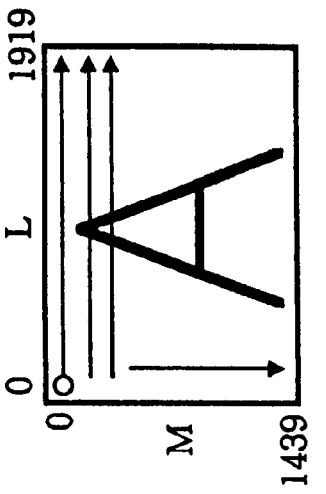
FIG. 5A ORIGINAL SCANNING
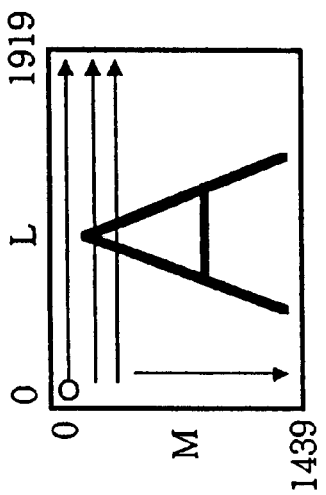
FIG. 5B WRITE TO MEMORY
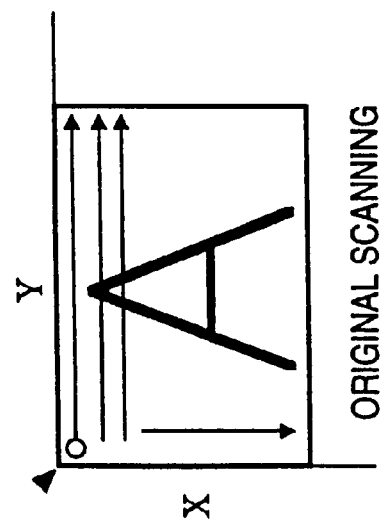
FIG. 5C READ FROM MEMORY
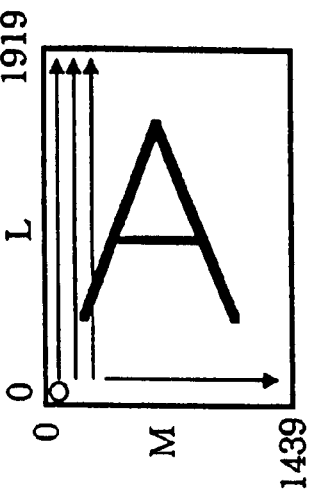
FIG. 5D ORIGINAL SCANNING
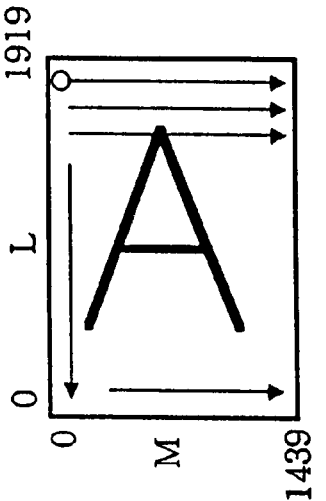
FIG. 5E WRITE TO MEMORY
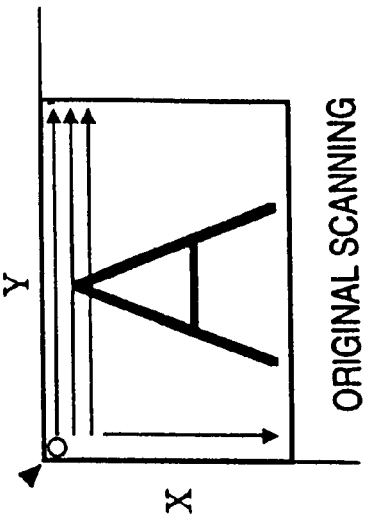
FIG. 5F READ FROM MEMORY

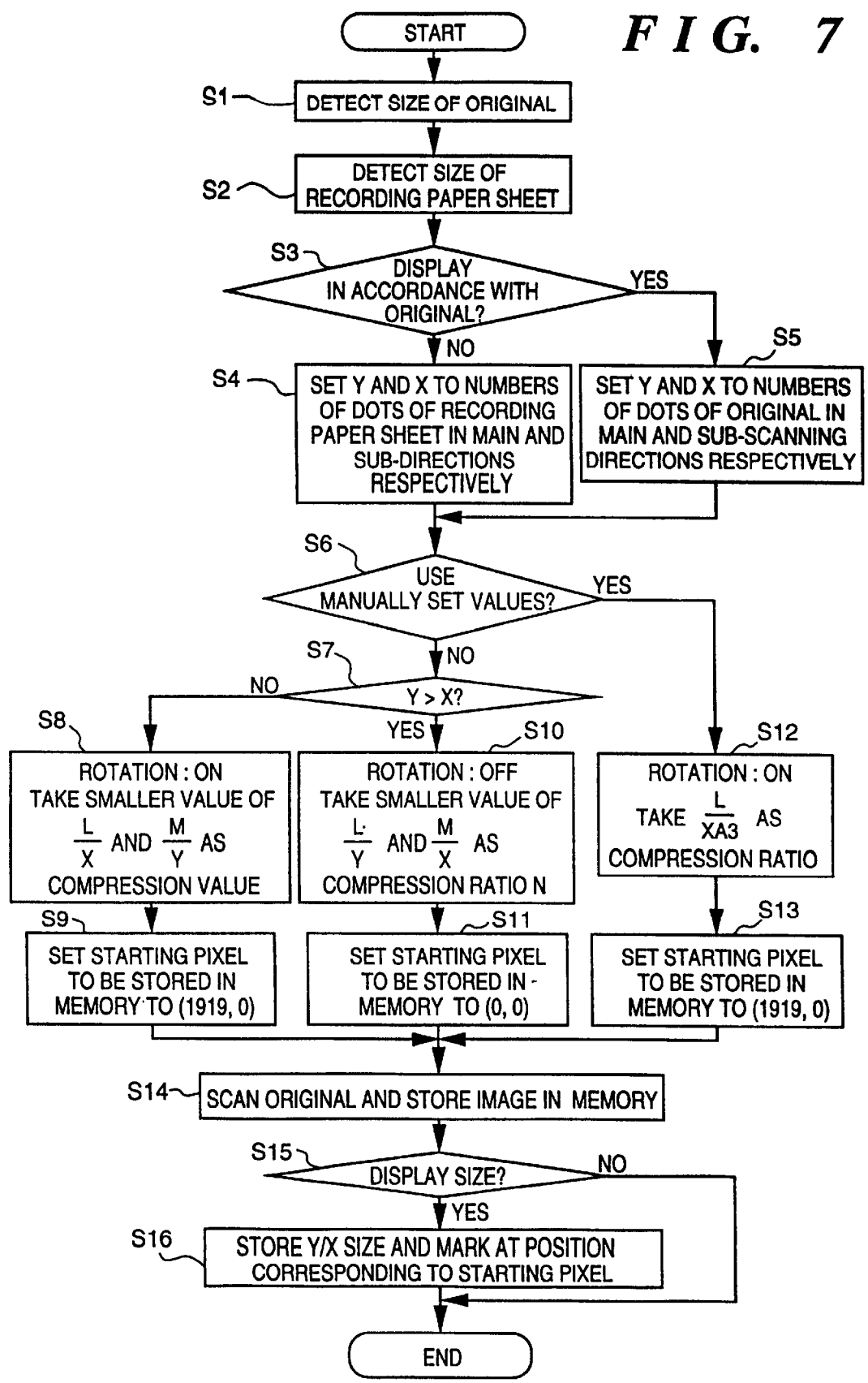

ON PLATEN

ON DISPLAY UNIT

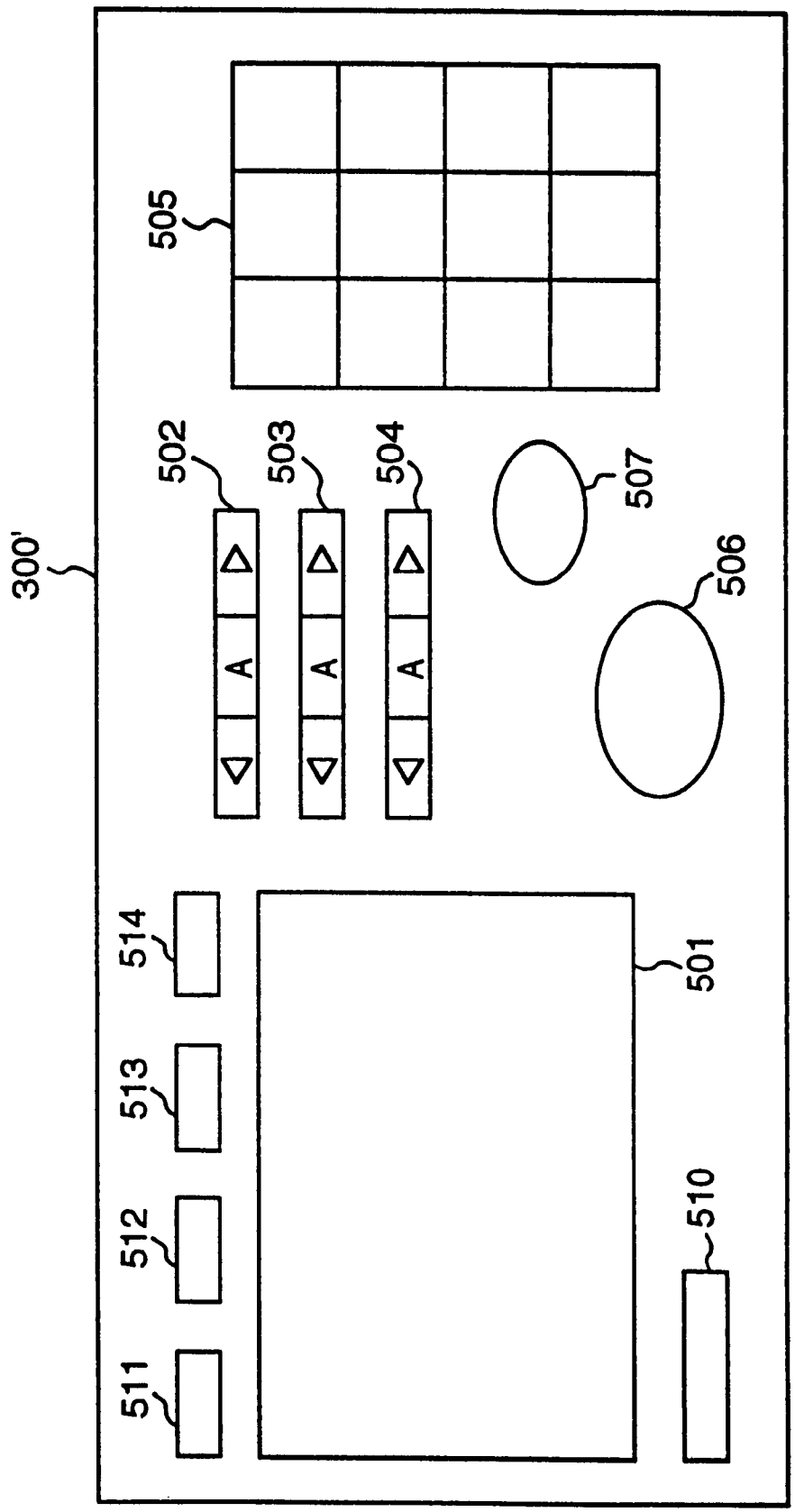

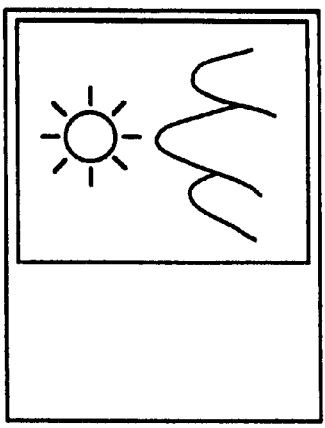
*F I G. 12C*
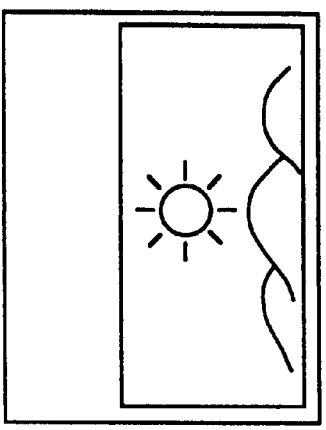
*F I G. 12F*
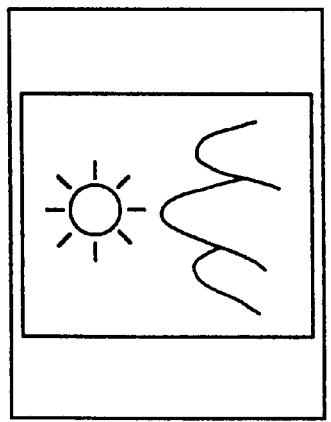
*F I G. 12B*
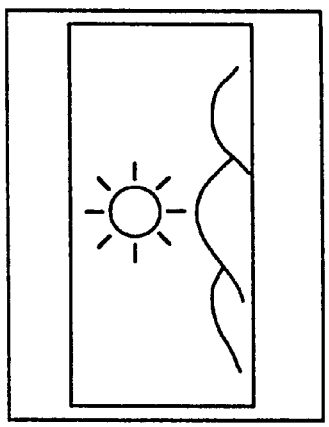
*F I G. 12E*
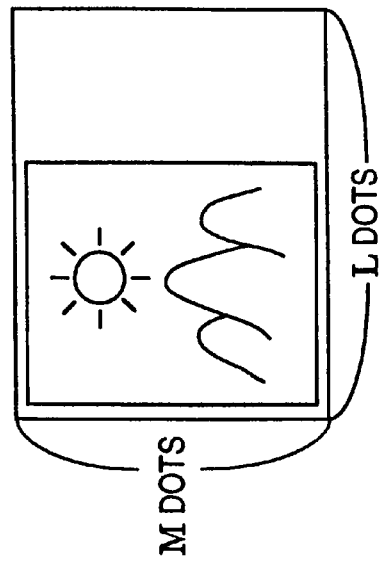
*F I G. 12A*
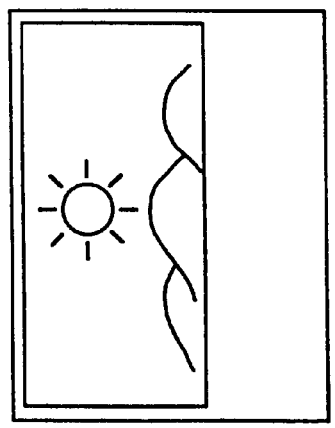
*F I G. 12D*

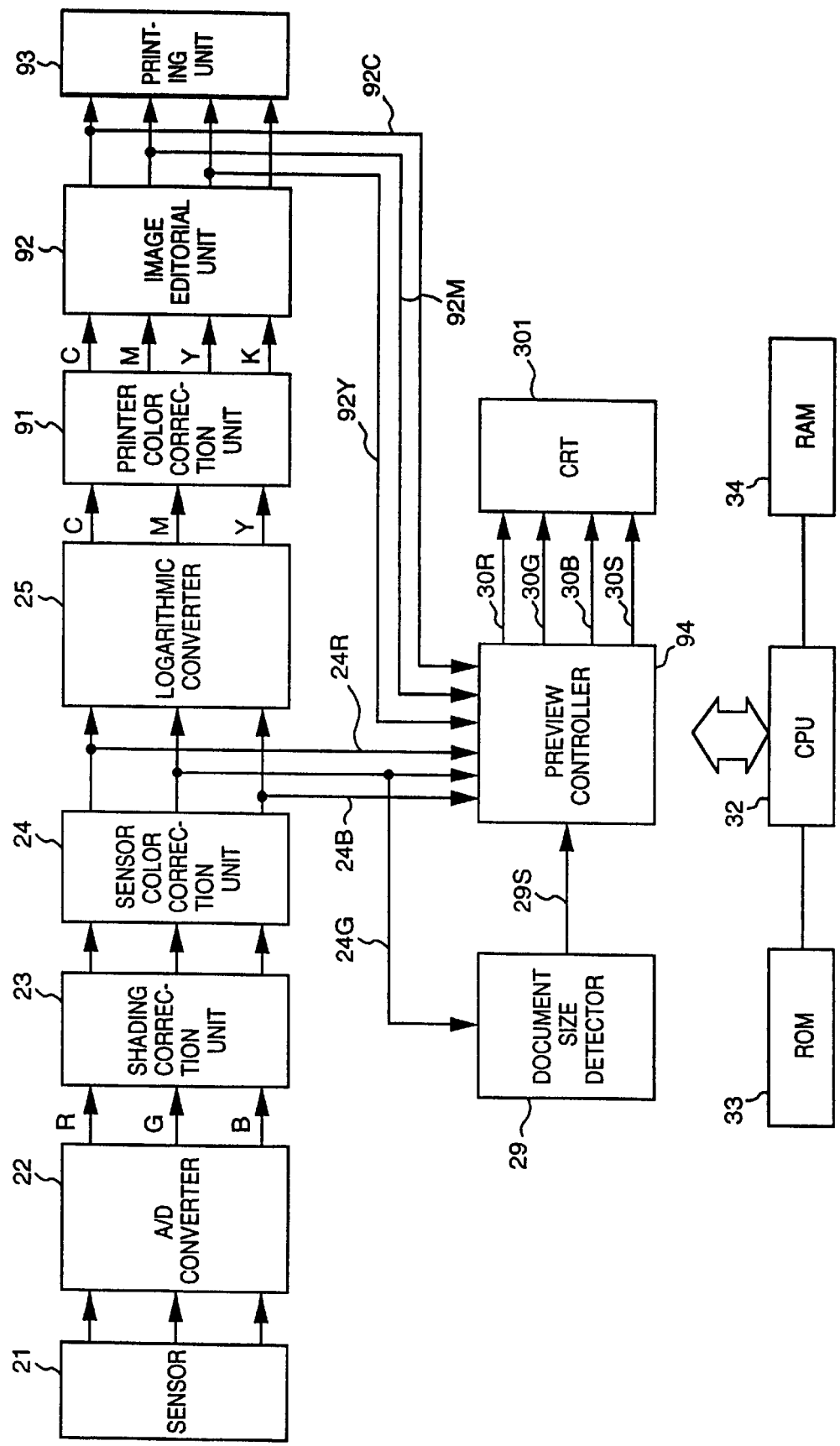

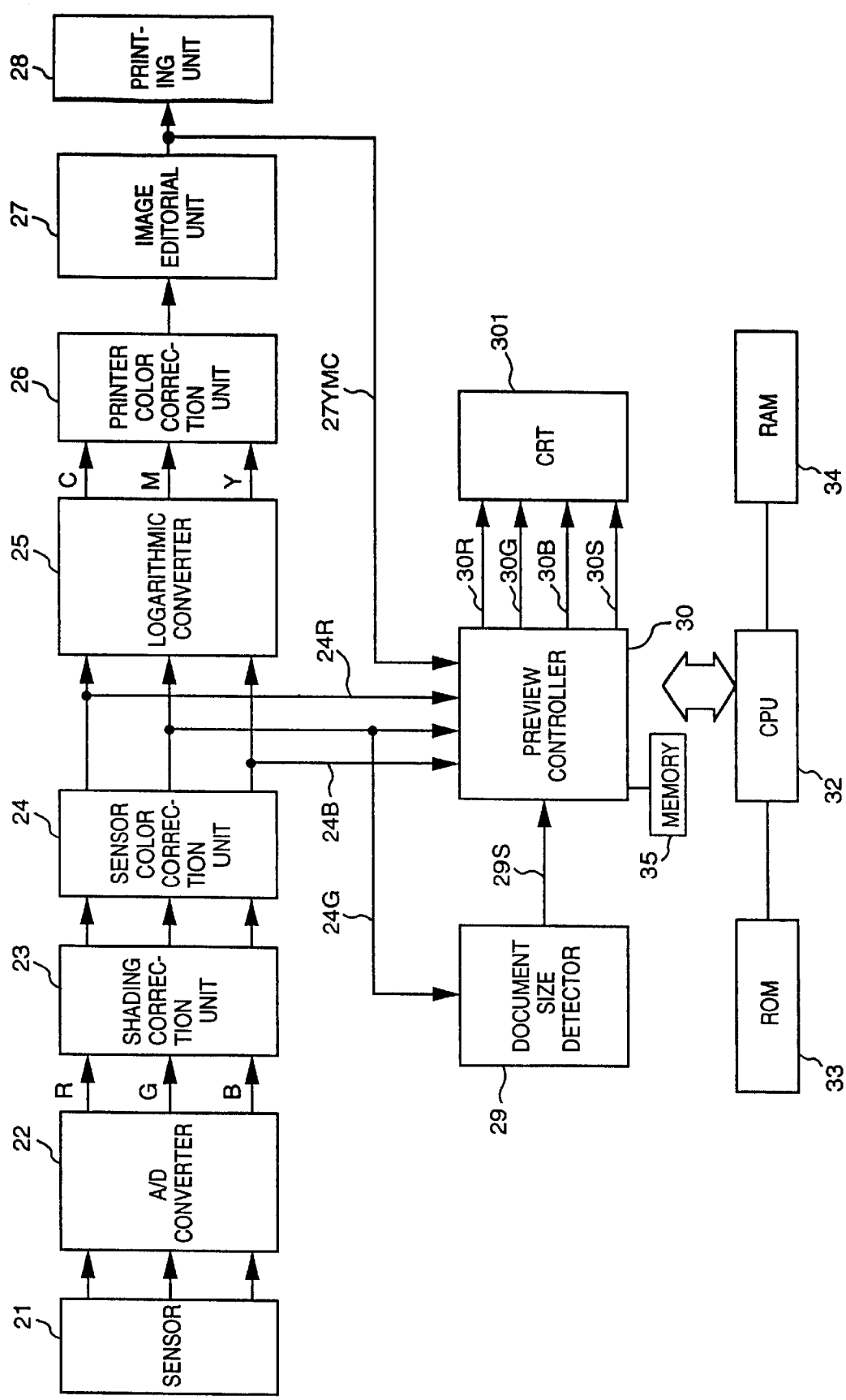

ON PLATEN

ON DISPLAY UNIT

IMAGE PROCESSING APPARATUS AND METHOD

BACKGROUND OF THE INVENTION

Present invention relates to an image processing apparatus and method and, more particularly, to an image processing apparatus and method capable of confirming an image by previewing.

Since conventional image processing apparatuses, such as a copying machine, are now able to deal with colors and equipped with highly technology functions, it becomes possible for these image processing apparatus to edit and output an image which is more complicated than ever. In order to obtain an edited image in the operator's desired colors, and the like, the edited image has to be actually printed on recording paper so as to confirm the processed image, and the operator often has to repeat this confirmation process many times until the desired image is obtained. This process is very inefficient in term of time and cost.

Accordingly, an image processing apparatus having a so-called "preview function" in which the edited image is displayed on a display device, such as CRT, instead of printing the edited image on recording paper, has been proposed and manufactured in order to dispense with aforesaid inefficient process.

As a conventional image processing apparatus having the preview function, an apparatus which displays to confirm a read document image on a monochrome liquid crystal display is manufactured. However, if an image processing apparatus can perform full-color image processing, it is impossible to confirm results of color adjustment or color conversion processes on the aforesaid monochrome liquid crystal display. Therefore, an image processing apparatus having a preview function to display the edited image on a full-color display unit has been proposed.

FIGS. 15A to 15C and 15A' to 15C' show relationship between sizes of originals and sizes of images displayed on a display unit of the image processing apparatus having a conventional preview function. More specifically, FIGS. 15A to 15C show originals whose sizes are A3, A4R, and A4, respectively, placed on a platen glass and seen from under it, and FIGS. 15A' to 15C' shows positions and sizes of displayed images, respectively corresponding to FIGS. 15A to 15C, on the display unit. Further, black triangles in FIGS. 15A to 15C indicate the reference positions for placing the originals. Similarly, black triangles in FIGS. 15A' to 15C' indicate the reference positions on the display unit corresponding to the reference position in FIGS. 15A to 15C.

An example of the image, corresponding to an A3-sized original which is the maximum size to be scanned, and displayed on the display, is shown in FIG. 15A'. Regarding A4R- and A4-sized originals, the images corresponding to these originals are displayed on the display unit as respectively shown in FIGS. 15B' and 15C' in the same compression ratio as that of the A3-sized original to the corresponding displayed image. Further, an original is always scanned from the same starting position on the platen glass regardless of the sizes of originals.

In the aforesaid conventional image processing apparatus, an image of an original is displayed on the display unit in the fixed compression ratio regardless of the size of the original, thus, the display unit displays an image of the platen cover in addition to the original image, or a useless blank area, as shown in FIGS. 15B' and 15C', thus the original image can not be displayed efficiently.

Further, in the aforesaid conventional image processing apparatus, the image of the original is not always displayed in the whole area of the display unit. Therefore, it is inconvenient to confirm which position of the recording paper sheet and in what size with respect to the size of the recording paper sheet, the scanned original image will be printed.

Furthermore, since the reference position on the platen glass is at the different corner from that on the display unit, it is difficult to check upper and lower edges and right and left edges of the original image on the platen glass.

Furthermore, in preview display, no matter what size the original is, the display position of the scanned original image on the display unit is fixed. As shown in FIGS. 15A' to 15C', for example, the original image is displayed so that the reference position is always at a corner of the display unit. Accordingly, in a case where an image which is displayed in a very small area on the display unit is to be processed, the image is displayed at a corner of the display unit, which does not provide an attractive view. Further, it is not possible to change the display position of an image on the display unit to the preferable position to the operator.

SUMMARY OF THE INVENTION

The present invention has been made in consideration of above situation, and has as its object to provide an image processing apparatus and method for controlling a method for storing image data for previewing in accordance with the size of an original image.

According to the present invention, the foregoing object is attained by providing an image processing apparatus comprising: input means for inputting image data representing an object image; storage means for generating and storing preview image data corresponding to the input image data; object size detecting means for detecting a size of the object image; and control means for controlling a storage-method for storing the preview image data in accordance with the size of the object image.

In accordance with the present invention as described above, it becomes possible to effectively display a preview image in accordance with the size of the original image, thus improving.operability.

It is another object of the present invention to provide an image processing apparatus and method for controlling a method for storing image data for previewing in accordance with the size of an output image.

According to the present invention, the foregoing object is attained by providing the image processing apparatus which is described above further comprising: image forming means for forming an output image corresponding to the input image data; and output size detecting means for detecting a size of the output image, wherein the storage means generates and stores preview.image data corresponding to the output image data, and the control means controlls the storage method for storing the preview image data in the storage means on the basis of the size of the output image.

In accordance with the present invention as described above, it becomes possible to effectively display a preview image in accordance with the size of the output image, thus improving operability.

It is another object of the present invention to provide an image processing apparatus and method for controlling a method for storing image data for previewing in accordance with the size of either an original image or an output image.

According to the present invention, the foregoing object is attained by providing an image processing apparatus comprising:. input means for inputting image data representing an object image; image forming means for forming an output image corresponding to the object image; and generating means for generating preview image data corresponding to the input image data; wherein the generating means has a first mode for generating the preview image data on the basis of a size of the object image and a second mode for generating the preview image data on the basis of a size of the output image.

In accordance with the present invention as described above, it becomes possible to effectively display a preview image in accordance with the size of either the original image or the output image, thus improving operability.

It is another object of the present invention to provide an image processing apparatus and method for synthesizing a scanned image with marks which enable to confirm a size, upper and lower edges, and right and left edges of the original image in accordance with displacement, size change, and rotation of a preview image.

According to the present invention, the foregoing object is attained by providing the image processing apparatus which is described above further comprising adding means for adding information on the preview image data.

In accordance with the present invention as described above, further improvement in operability can be achieved.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is an external view of an operating unit 300 according to the first embodiment;

FIG. 3 is a block diagram illustrating a flow of an image signal according to the first embodiment;

FIG. 4 is a block diagram illustrating a detailed configuration of a preview controller according to the first embodiment;

FIGS. 5A to 5F are explanatory views for explaining a rotation process according to the first embodiment;

FIG. 7 is a flowchart showing preview processing according to the first embodiment;

FIG. 10 is an external view of the operating unit 300' according to a second embodiment of the present invention;

FIGS. 12A to 12F are examples of preview images according to the second embodiment;

FIG. 13 is a block diagram illustrating a flow of an image signal according to a third embodiment of the present invention;

FIG. 14 is a block diagram illustrating a flow of an image signal according to a fifth embodiment of the present invention.

DETAILED DESCRIPTION OF THE PREFERRED EMBODIMENTS

Preferred embodiments of the present invention will be described in detail in accordance with the accompanying drawings.

<First Embodiment>

Figure 1:
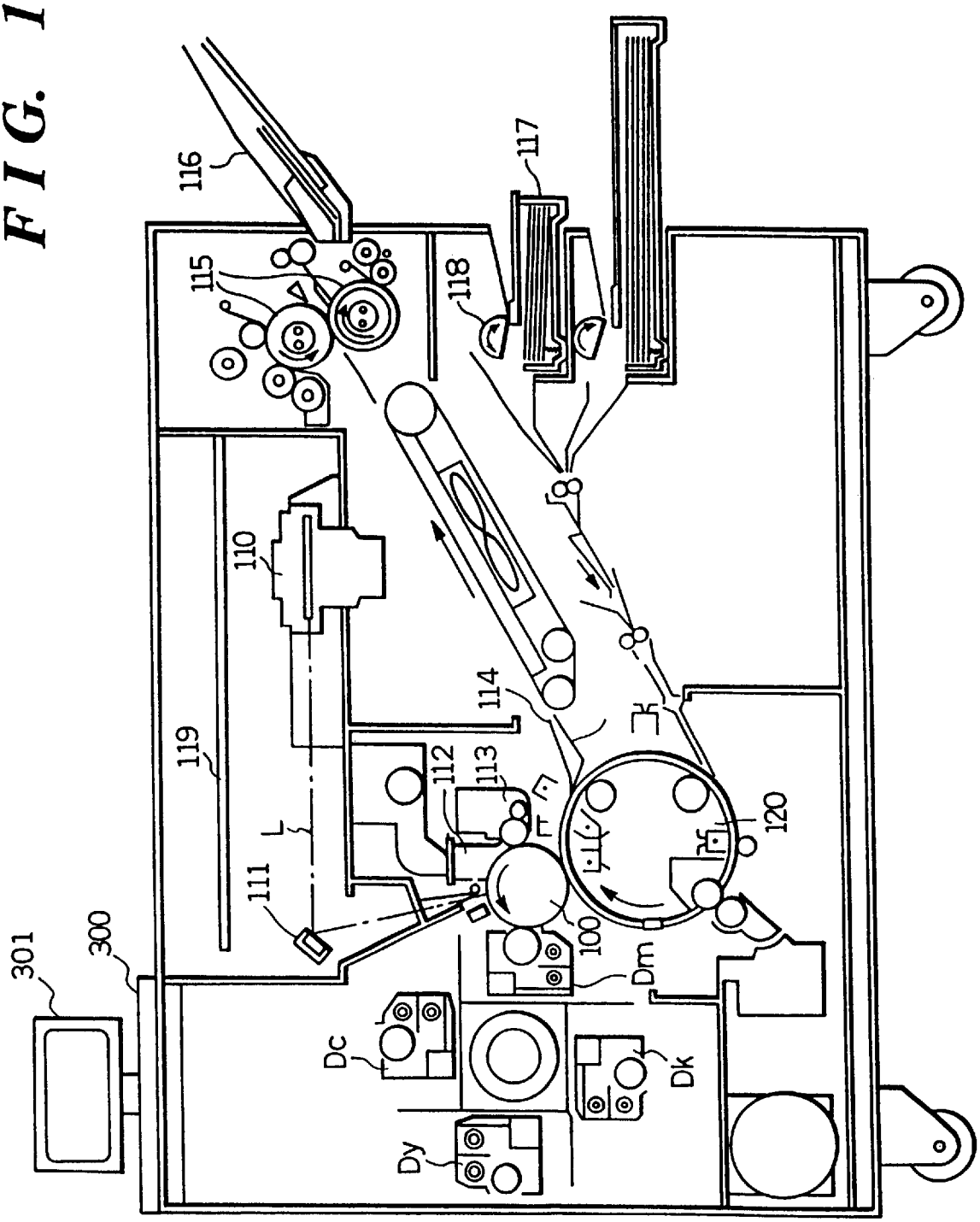
FIG. 1 is a cross-sectional view of a color copying machine according to a first embodiment of the present invention.

FIG. 1 is a cross-sectional view of a color copying machine adopting a digital electrophotographing method according to a first embodiment.

Referring to FIG. 1, a recording paper sheet is set on the periphery of a transfer drum 120 by a paper-feed roller 118 from a paper-feed tray 117. An electrostatic drum 100 is uniformly charged to a predetermined polarity by a charger 112. Then, by exposing the electrostatic drum 100 by a laser beam L which is emitted from a laser 110 and reflected by a mirror 111, a latent image of each color is formed on the electrostatic drum 100. The latent image formed on the electrostatic drum 100 is processed by each of color developers, Dy, Dm, Dc, and Dk, then each developed image is transferred to the recording paper sheet which is placed on the periphery of the transfer drum 120. This transferring process is repeated a plurality of times, thereby a color image is formed. Thereafter, the recording paper sheet is separated from the transfer drum 120 by a claw separation 114, and the transferred color image is fixed at the fixing unit 115, then the recording paper sheet is discharged to the paper-discharge tray 116. Note that reference numeral 113 denotes a cleaner which removes residual toner of each color from the surface of the electrostatic drum 100.

Further, reference numeral 300 denotes an operating unit on which various kinds of switches and an LCD display device and the like are provided, and reference numeral 301 denotes a CRT for displaying a preview image according to the first embodiment.

Reference numeral 119 denotes an image processing unit which applies various image processes to the image data inputted from a scanner (not shown), for example, and controls the aforesaid units.

FIG. 2 is a top view of the operating unit 300. In FIG. 2, reference numeral 501 denotes an LCD (liquid crystal display) device for displaying various states of the copying machine. Further, reference numeral 502 denotes the magnification/compression key for setting a magnification or compression ratio; 503, a tray selection key for setting a size of recording medium on which an image is to be outputted; 504, a density key for setting the output density; 505, a numeric keyboard for setting the number of copies to make, and so on; 506, a start key for designating to start copying; and 507, a stop key for terminating a process. Further, keys for setting displacement and rotation of a preview image is also provided, although they are not shown.

Reference numeral 510 denotes a preview key, and the preview processing on the CRT 301 is initiated by pressing the preview key 510.

Reference numeral 511 to 513 are switches used in the preview processing. Switch 511 is for setting whether an image is to be displayed in accordance with the size of the original or in accordance with the size of the image to be printed on a recording paper sheet, when the image is displayed on the CRT 301. Switch 512 is for setting whether a preview image is to be displayed on the basis of manually set values which indicate magnification/compression, displacement, and rotation regardless of the size of the original image or displayed on the basis of the size of the recording paper sheet, or displayed on the basis of automatically set values. Switch 513 is for setting whether or not to display on the CRT 301 a size of a document and a reference position mark at the same point as the platen glass in the display.

It is assumed that the switches 511 to 513 are set by an operator before the preview processing is started.

Note, the designation set by each switch will be described later. Further, the designation set by the switches 511 to 513 uses predetermined values. These switches can be set by an operator or can be set only by a maintenance person.

It should be noted that the configuration of the operating unit 300 in the first embodiment is not limited to that shown in FIG. 2, and further complicated settings may be possible by using a touch panel and the like, for example.

Next, an image processing according to the first embodiment will be described below more specifically.

FIG. 3 is a block diagram illustrating a flow of an image signal in the aforesaid color copying machine. In FIG. 3, units other than a sensor 21, a printing unit 28 and the CRT 301 are included in the above-described image processing unit 119.

In FIG. 3, reference numeral 21 denotes the sensor, such as a line sensor composed of a photoelectric converter, e.g., a CCD, with a color separation filter, for instance, and the sensor 21 outputs RGB images of red (R), green (G), and blue (B) Note the sensor 21 reads an image by scanning an original (not shown) by moving in a sub-scanning direction driven by a motor (not shown). Then, the sensor 21 repeatedly scans the original as many times as the number of color recording materials to be used in the printing unit 28 which will be described later.

Reference numeral 22 denotes an A/D (analog/digital) converter for converting the input analog RGB image signals into digital RGB signals; 23, a shading correction unit for correcting the digital RGB signals in accordance with characteristics of the sensor 21, such as unevenness of quantity of light when reading the original; 24, a sensor color correction unit for correcting spectral characteristics of the color separation filter of the sensor 21; 25, a logarithmic converter for converting the RGB luminance signals inputted from the sensor color correction unit 24 into YMC density signals of yellow (Y), magenta (M), and cyan (C), for example; and 26, a printer color correction unit for correcting YMC density signals, for example, in accordance with the spectral reflectance characteristics of the color recording materials used in the printing unit 28, and generating data of black (K) component. Note that the printing unit 28 in the first embodiment uses a single electrostatic drum, thus image data of each color component inputted from the logarithmic converter 25 to the printer color correction unit 26 in parallel is outputted as a serial frame sequential signal of Y, M, C and K.

Reference numeral 27 is an image editorial unit for performing various image editorial processes, such as color balance correction, magnification, compression, displacement, changing to mirror image, and so on. These image editorial processes are set or corrected in response to designation by the operator from the operating unit 300. The image data inputted into the image editorial unit 27 is processed by CPU 32 by executing a processing program which is set in ROM 33 in advance on the basis of the correction value set from the operating unit 300. The image signal which is edited as desired by the image editorial unit 27 is outputted to the printing unit 28 in synchronization with a synchronizing signal from the printing unit 28 as a frame sequential image data corresponding to color recording materials. Then, frame images of different colors are overlay-printed on the recording paper sheet, thereby obtaining the desired color image.

Note that the printing unit 28 realizes full-color printing by performing overlay-printing with color recording materials of a plurality of standard colors on the recording paper sheet. As for the color recording materials, four colors of YMCK are used in the first embodiment, however, the colors of the recording materials are not limited to these. Further, any kinds of output methods, such as an electrophotographic method and an ink-jet method, can be used in the printing unit 28. Furthermore, the printing unit 28 includes a plurality of paper feed trays each of which equipped with a member for identifying the sizes of recording paper sheets, and the CPU 32 is supplied with information on the size of the recording paper sheets currently set for the printing by an operator performing a predetermined setting from the operating unit 300.

The above description is a basic printing processing in the copying machine of the first embodiment. Next, a configuration to realize the preview function in the first embodiment will be described below.

In FIG. 3, reference numeral 29 denotes a document size detector, and when the original on the platen glass (not shown) is scanned by the sensor 21, the document size detector 29 determines coordinate information of a corner of an original for judging at which position of the scanning area of the platen glass the original is placed. Further, reference numeral 30 denotes a preview controller which performs various controls for displaying image information on a CRT 301, and its details will be described later.

The CPU 32 governs and controls all the units of the copying machine of the first embodiment as described above, and the ROM 33 stores various control programs including programs for processes shown in a flowchart which will be explained later, and fixed values. The control programs are read into a RAM 34 by CPU 32, then executed by using the RAM 34 as a working area.

There are two kinds of available preview processing in the first embodiment, and one is to display an original image and the other is to display a processed image to be outputted.

First, in a case where a read original image is to be previewed, an output from the sensor color correction unit 24 (24R, 24G, and 24B) is inputted into the preview controller 30, then after applied with the preview processing (30R, 30G, and 30B), the processed image is displayed on the CRT 301.

Next, in a case where an output image which is applied with the predetermined image processing by the copying machine is to be previewed, a frame sequential image signal (27YMC) outputted from the image editorial unit 27 is inputted into the preview controller 30. Thereafter, the preview controller 30 converts the input YMC density information into RGB luminance information, then an image based on the RGB luminance information is displayed on the CRT 301. In other words, since the image data outputted from the image editorial unit 27 is displayed on the CRT 301, it results in displaying the image to be outputted to the printing unit 28 on the CRT 301.

Further, the original size information (29S) detected by the document size detector 29 is also inputted into the preview controller 30, thus an accurate area of the original can be known, as described later. Note, a platen cover for pressing the original against the platen glass is smooth, therefore, the document size detector 29 can distinguish the original from an area other than the original by binarizing a G component (24G) of image signals.

The detailed configuration of the aforesaid preview controller 30 is shown in FIG. 4, and explained below.

In FIG. 4, reference numeral 85 denotes an inverse logarithmic converter for converting YMC density signals into RGB luminance signals, whose operation is opposite to the conversion by the logarithmic converter 25 shown in FIG. 3; 101, a gate for switching input RGB signals; 81R, 81G, and 81B, first-in-first-out (FIFO) circuits for R, G, and B signals, respectively; 82R, 82G, and 82B, image memories corresponding to respective colors, which consist of video RAM for display, and the like; 83R, 83G, and 83B, look-up tables (LUT) corresponding to respective colors; and 84R, 84G, and 84B, D/A converters. Further, reference numeral 200 denotes a display controller for controlling processes, such as rotation, displacement, magnification/compression, and synthesizing process, applied to the input RGB signals. These processes will be described later. Note, luminance signals to be inputted to the FIFOs 81R, 81G and 81B are denoted by 85R, 85G, and 85B, respectively.

In FIG. 4, reference numerals 24R, 24G, and 24B are signals of each color component outputted from the sensor color correction unit 24 shown in FIG. 3, namely, the signals representing an original image. The signals 24R, 24G, and 24B are inputted into the respective FIFOs 81R, 81G, and 81B via the gate 101. The FIFOs 81R, 81G, and 81B are for changing speed in order to store image data, transmitted in the apparatus at high speed, to the image memories 82R, 82G, and 82B and for compressing size of the scanned original image to a display size of the CRT 301. The size can be arbitrary set by CPU 32 via control lines 201 from the display controller 200.

Data writing and reading processes to/from the image memories 82R, 82G, and 82B are controlled by the display controller 200 via the control line 202. The image memories 82R, 82G, and 82B in the first embodiment are frame memories for each color, and each of the memories can store a frame of 1920×1440 pixels which is larger then a display size of the CRT 301, i.e., 640×480 pixels. Further, not only data writing and reading of an arbitrary pixel in each frame from each memory but also data writing and reading performed after compression and rotation, applied in accordance with the display size of the CRT 301, are possible under control of the display controller 200. Note, the size of the image memory is not limited to above, and it can be decided depending upon apparatuses to be used.

Next, FIGS. 5A to 5F show scanning directions in a case of displaying the read image on the CRT 301 after and without being applied with rotation according to the first embodiment.

FIGS. 5A to 5C show scanning directions when scanning an original, writing to the image memory, and reading from the image memory without applying rotation. Further, FIGS. 5D to 5F show scanning directions when scanning an original, writing to the image memory, and reading from the image memory when rotation is applied. In each figure, a position marked by ○ indicates a starting pixel of the scanning. An arrow coming out from ○ shows the main scanning direction, and an arrow which is perpendicular to the main scanning direction shows the sub-scanning direction. More specifically, in FIGS. 5A and 5D, the Y direction is the main scanning direction and the X direction is the sub-scanning direction. Further, in FIGS. 5B, 5C, 5E and 5F, L is a long side in displaying the image on the CRT 301 (1920 dots in the first embodiment) and M is a short side (1440 dots in the first embodiment).

In order to display a rotated image in the first embodiment as shown in FIGS. 5D to 5F, pixel positions of the read original image shown in FIG. 5D are controlled so as to exchange the X direction and the Y direction of the original image, and obtained data is written to the image memory in a sequence as shown in FIG. 5E, thereby "a rotated image" is written into each of the image memories 82R, 82G, and 82B.

Further, data can be directly read and written from/to the image memories 82R, 82G, and 82B by the CPU 32 via the display controller 200. Further, by adding an arbitrary pattern image, such as a character and a mark, to the original image information read by the sensor 21 stored in each of the image memories 82R, 82G, and 82B by using the CPU 32, it is possible to display an synthesized image.

The LUTs 83R, 83G, and 83B shown in FIG. 4 correct for the characteristics of the CRT 301, and can be performed with an arbitrary correction under control of the CPU 32 via the display controller 200. The D/A converters 84R, 84G, and 84B convert input digital signals into analog signals, and output the converted analog signals to the CRT 301 as 30R, 30G, and 30B. Note, a synchronizing signal 30S used for displaying an image is also outputted from the display controller 200 to the CRT 301.

Meanwhile, the edited frame sequential signal 27YMC, shown in FIG. 3, is inputted into the inverse logarithmic converter 85 where the signal 27YMC is converted into RGB luminance signals. Then, converted signals of R, G, and B are stored in the respective image memories 82R, 82G, and 82B via the FIFOs 81R, 81G, and 81B, then displayed on the CRT 301.

Figure 6A:
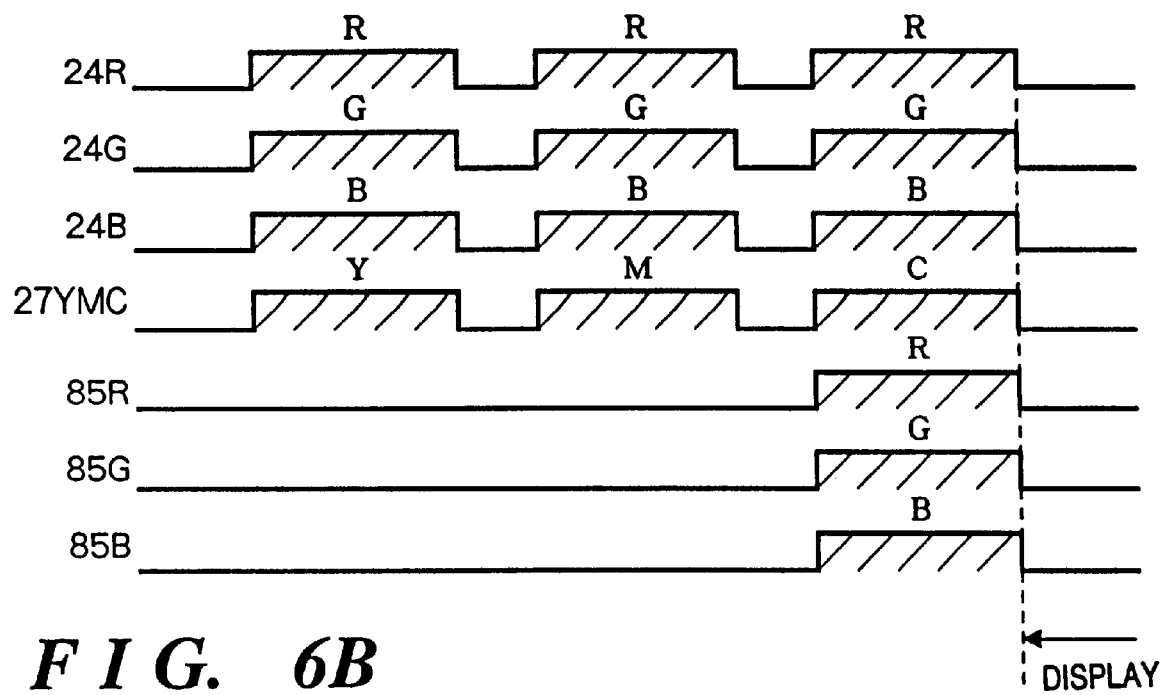
FIGS. 6A and 6B are timing charts of preview display according to the first embodiment.
Figure 6B:
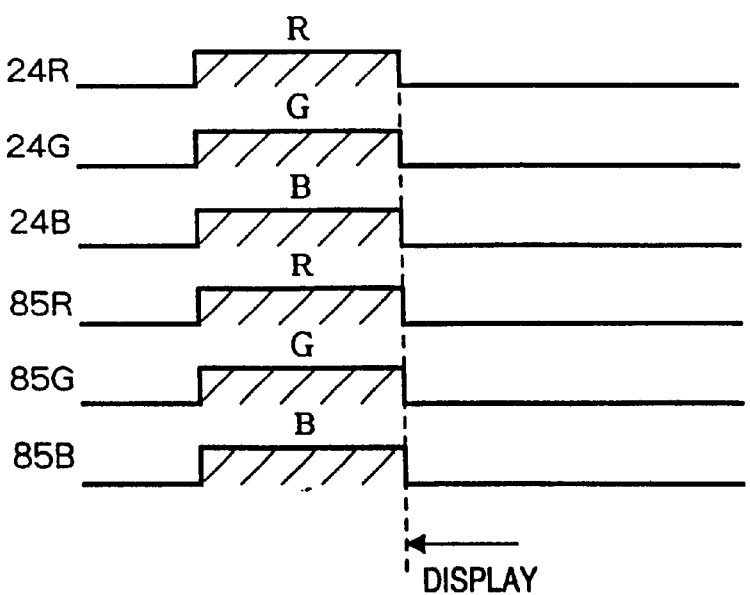

FIGS. 6A and 6B are timing charts in the preview processing in the first embodiment.

First, FIG. 6A shows a timing chart when an image is displayed on the basis of the edited image signal 27YMC In FIG. 6A, reference numerals 24R, 24G, and 24B denote RGB luminance signals outputted from the sensor color correction unit 24, and reference numerals 85R, 85G, and 85B denote luminance signals converted from density signals in the inverse logarithmic converter 85. In the first embodiment, the signal 27YMC is inputted to the preview controller 30 in a frame sequential manner, thus a set of signals of R, G, and B are obtained after three scanning processes. Therefore, a preview image display on the CRT 301 becomes possible after the three scanning processes.

In contrast, FIG. 6B is a timing chart when an image is displayed on the basis of the unedited color image signals 24R, 24G, and 24B. Since the signals 24R, 24G, and 24B are inputted to the preview controller 30 in parallel, preview image display on the CRT 301 becomes possible only after one scanning process.

A flowchart of the preview processing according to the first embodiment is shown in FIG. 7.

In advance of starting the preview processing, an operator designates a desired display state by using the switches 511 to 513 in the operating unit 300.

Then, the preview processing is started by pressing dthe preview key 510 on the operating unit 300 before the start key 506 for instructing to start copying is pressed.

First at step S1, the sensor 21 scans an original so as to detect the size of the original on the platen glass, and the document size detector 29 detects the number of dots in the main scanning direction and in the sub-scanning direction. This scanning operation is called "pre-scanning", hereinafter, in order to distinguish from the scanning operation performed for actually outputting an image on a recording paper sheet (called "general scanning", hereinafter). Then at step S2, the size of a recording paper sheet in the paper feed tray designated from the operating unit 300 is detected by the printing unit 28.

Thereafter, the process proceeds to step S3 where whether the switch 511 is set to "display in accordance with the size of the original" or not is determined. If it is set to "display in accordance with the size of the original", the process goes to step S5, and the numbers of dots of the original in the main and sub-scanning directions obtained at step S1 are respectively set as variables Y and X. Whereas, if the switch 511 is not set to "display in accordance with the size of the original" at step S3, namely the switch 511 is set to "display in accordance with the size of the recording paper sheet", the process proceeds to step S4, and the numbers of dots of the recording paper sheet in the main and sub-scanning directions obtained at step S2 are respectively set as variables Y and X.

Next at step S6, whether the switch 512 is set to "display an image processed with magnification/compression, displacement, and rotation performed on the basis of manually set values" or not is determined. If NO at step S6, namely, if the values are to be automatically set, the process proceeds to step S7 where the Y value, the number of pixels of the original or the number of pixels of the recording paper sheet in the main scanning direction, is compared with the X value, the same in the sub-scanning direction.

At step S7, if Y>X, namely, if the number of dots in the main scanning direction is larger than the number of dots in the sub-scanning direction, the lengths in the main scanning direction (L: 1920 dots) of images stored in the image memory 82R, 82G, and 82B for display are longer than the lengths in the sub-scanning direction (M: 1440 dots), it is unnecessary to rotate the image. Therefore, the process moves to step S10, and a flag for instructing to perform a rotation process is turned off. Note, the flag is stored in the RAM 34, for instance. Then, in order to display the entire read original image, it is necessary to perform a compression process so that the original image can be stored inside of the image memory. As a compression ratio for the compression process, the smaller value of L/Y in the main scanning direction and M/X in the sub-scanning direction is used as the compression ratio N. Then, the process proceeds to step S11 where the starting pixel (L0, M0) from which an image is stored in the memories 82R, 82G, and 82B, is set to (0, 0), as shown in FIG. 5B.

On the other hand, if Y>X is not satisfied, namely, the number of dots in the main scanning direction is equal or smaller than the number of dots in the sub-scanning direction, the length of the original image in the main scanning direction is equal or smaller than the length in the sub-scanning direction, whereas the lengths (L: 1920 dots) of the frames stored the image memories 82R, 82G, and 82B in the main scanning direction is larger than the lengths (M: 1440 dots) in the sub-scanning direction, thus, it is necessary to rotate the image in order to display an image effectively. Therefore, the process proceeds to step S8, where a flag instructing to perform the rotation process is turned on. Further, upon displaying a preview image, the smaller value of the value L/X in the main scanning direction for the display screen and the value M/Y in the sub-scanning direction for the display screen is taken as the compression ratio N. Then the process proceeds to step S9 where the starting pixel (L0, M0) from which an image is stored in the memories 82R, 82G, and 82B, is set to (1919, 0), as shown in FIG. 5E.

Whereas, if it is determined that an image processed with magnification/compression, displacement, and rotation performed on the basis of manually set values is to be displayed at step S6, the process moves to step S12. At step S12, the flag instructing to perform the rotation process is turned on, and L/X (X is the number of dots of the longer side of the A3 size) is set as a compression ratio N so that an A3-sized original, which is the maximum size for the copying machine to make a copy, can be displayed. Further, the starting pixel (L0, M0) from which an image is stored in the memories 82R, 82G, and 82B, is set to (1919, 0).

As described above, by setting the starting pixel from which an image is stored in the image memories at steps S9, S11 and S13, the preview image is displaced to the best position on the CRT 301.

The process proceeds to step S14 where the CPU 32 sets obtained parameters, e.g., the set values, the compression ratio, the flag, as described above in the display controller 200. Then, the sensor 21 pre-scans the original once more, then the read image is processed in accordance with the set parameters then stored in the image memories 82R, 82G, and 82B.

Next at step S15, whether a size of the image and a reference position mark are to be displayed on the display screen or not is determined. If it is set so as to display these values, the process proceeds to step S16. Note, the image size to be displayed in this case is either the size of the original or the size of the recording paper sheet determined in accordance with the setting by the switch 511.

At step S16, the CPU 32 converts the numbers of dots in the main scanning (Y) direction and in the sub-scanning (X) direction to the size of the original, and writes data indicating the size, e.g., A4, in a predetermined position in the image memories 82R, 82G, and 82B. Further, the mark indicating the reference position is written to the image memories in the similar manner at the position corresponding to the starting pixel.

Whereas, if it is set so as not to display the size and the mark at step S15, then step S16 is skipped, and the preview processing is completed.

After the preview processing is completed as described above, when the operator presses the start key 506 on the operating unit 300, general scanning of the original is started, and an image which is similar to the preview image is printed on the recording paper sheet.

As described above, it is possible to display the edited original image in the most efficient size in the display area of the CRT 301 according to the first embodiment.

Figure 8A:
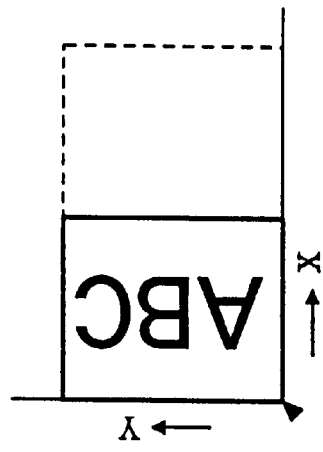
FIGS. 8A to 8C and 8A' to 8C' are examples of preview images according to the first embodiment.
Figure 8B:
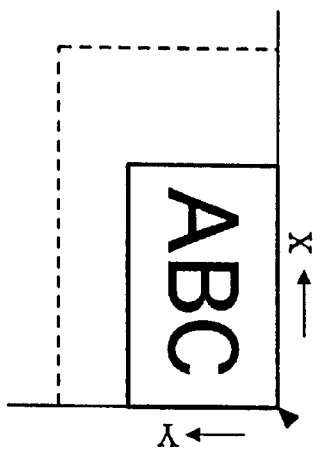
Figure 8C:
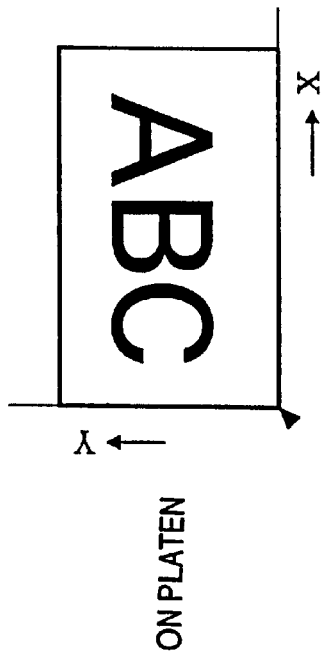
Figure 8A:
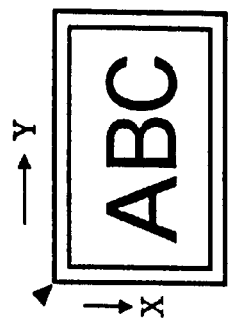
Figure 8B:
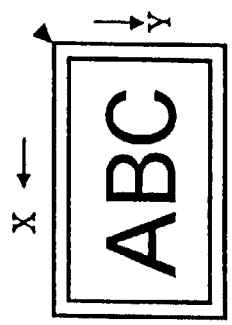
Figure 8C:
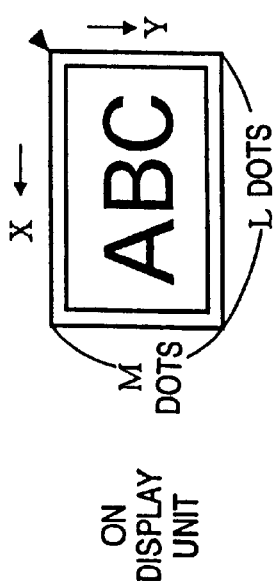

FIGS. 8A to 8C, 8A' to 8C', and 9 are examples of images on the display in the preview processing. FIGS. 8A to 8C show original images on the platen glass, and black triangles denote the reference position, Y denotes the main scanning direction, and X denotes the sub-scanning direction. Further, FIG. 8A shows the original of the maximum size (A3) for the copying machine to make a copy in the first embodiment. FIGS. 8A' to 8C' are displayed results of the images shown in FIGS. 8A to 8C on the CRT 301 in the preview processing, and the outer frame is the display screen frame of the CRT 301 and the inner frame is a preview image display area. The preview image display area shown in FIGS. 8A' to 8C' is composed of L dots in the longer side and M dots in the shorter side, and, similarly to FIGS. 8A to 8C, the black triangles in FIGS. 8A' to 8C' denote the reference position and they correspond to the reference positions in FIGS. 8A to 8C, respectively.

The original image shown in FIG. 8A is written to the memory from the starting pixel in accordance with the start-writing address set at step S13 in the flowchart shown in FIG. 7, and changed its size properly, thereby the preview image shown in FIG. 8A' is obtained. Further, the original image shown in FIG. 8B is written to the memory from the starting pixel in accordance with the start-writing address set at step S11 in the flowchart shown in FIG. 7, and changed its size properly, thereby the preview image shown in FIG. 8B' is obtained. Furthermore, the original image shown in FIG. 8C is written to the memory from the starting pixel in accordance with the start-writing address set at step S9 in the flowchart shown in FIG. 7, and changed its size properly, thereby the preview image shown in FIG. 8C' is obtained.

Figure 9:
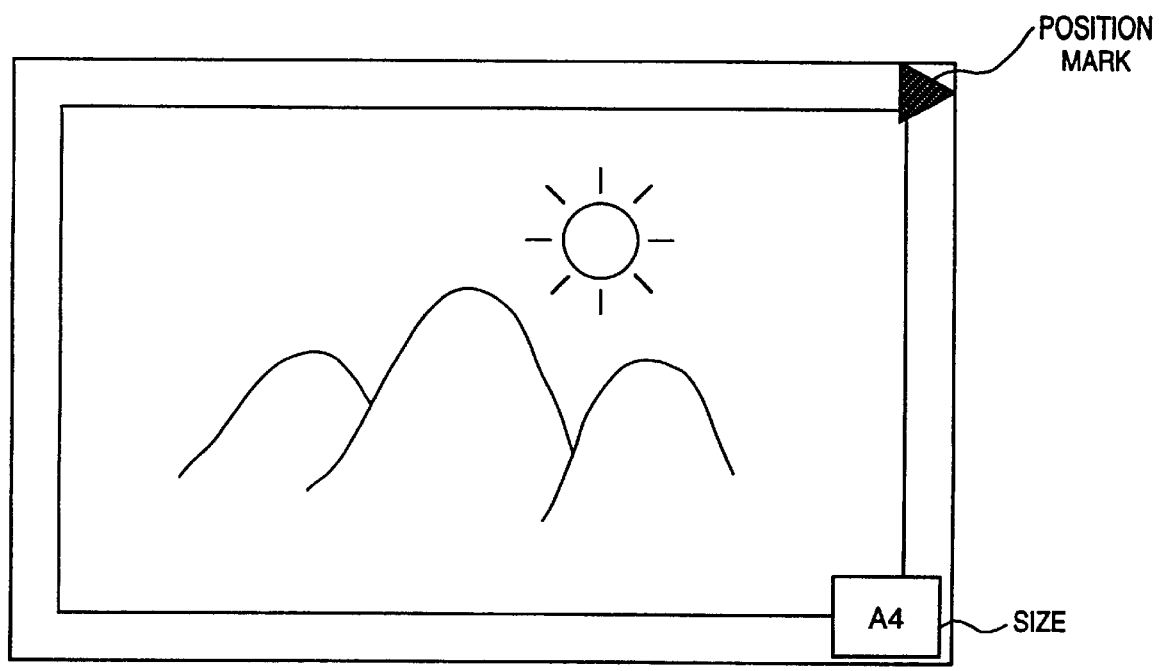
FIG. 9 is an example of displayed synthesized image obtained by adding additional information to a preview image according to the first embodiment.

Further, FIG. 9 shows a processed result at step S16, which is an example when the size of the original and the mark indicating the reference position is displayed in addition to the original image.

According to the first embodiment as described above, a preview image which has close resemblance to the image which will be actually outputted can be displayed in a form that an operator can easily confirm the image to be outputted by automatically controlling the displacement, magnification/compression, and rotation on the basis of the size of the original and the size of the display screen.

Further, by synthesizing the size of the image to be outputted, a reference position mark and the image, it becomes easy to confirm the size of the image, the upper and lower edges of the image, and the right and left edges of the image when magnification/compression or rotation is applied to the image.

<Second Embodiment>

A second embodiment of the present invention is described below.

The feature of the second embodiment is that a display position of a preview image on a display screen can be arbitrary changed in the preview processing which is described in the aforesaid first embodiment.

A configuration of a color copying machine in the second embodiment is the same as that in the first embodiment, thus its explanation is omitted.

FIG. 10 is a top view of an operating unit 300' in the second embodiment. In FIG. 10, the same elements as those in FIG. 2 are referred by the same reference numerals, and explanations of those are omitted. In FIG. 10, reference numeral 514 denotes a switch for setting a display position of an image on the CRT 301. For a simplicity sake, display positions which can be designated by the switch 514 are a side, i.e., either an area on the right or left edge, or the center.

Figure 11A:
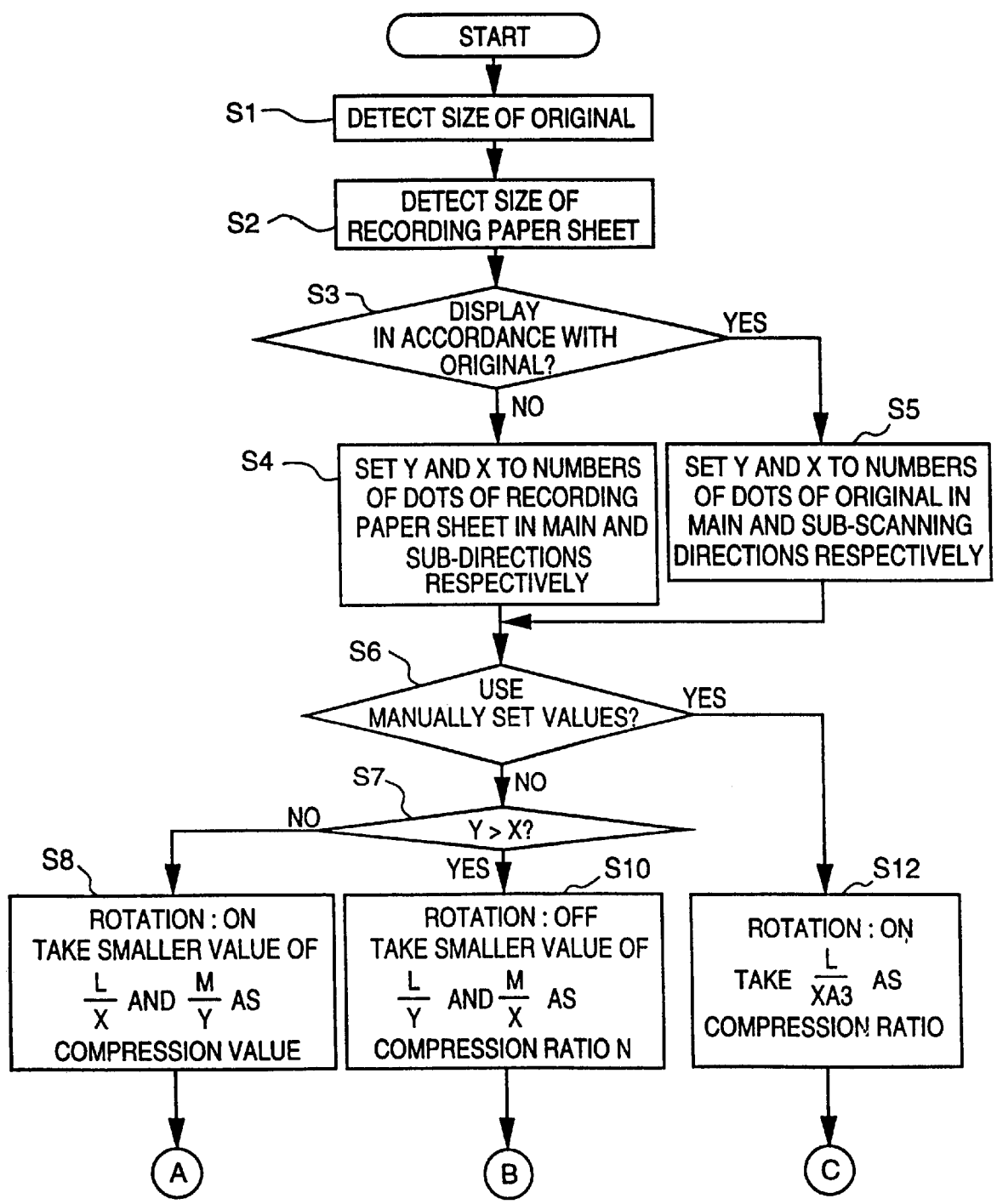
FIGS. 11A and 11B are flowcharts showing preview processing according to the second embodiment.
Figure 11B:
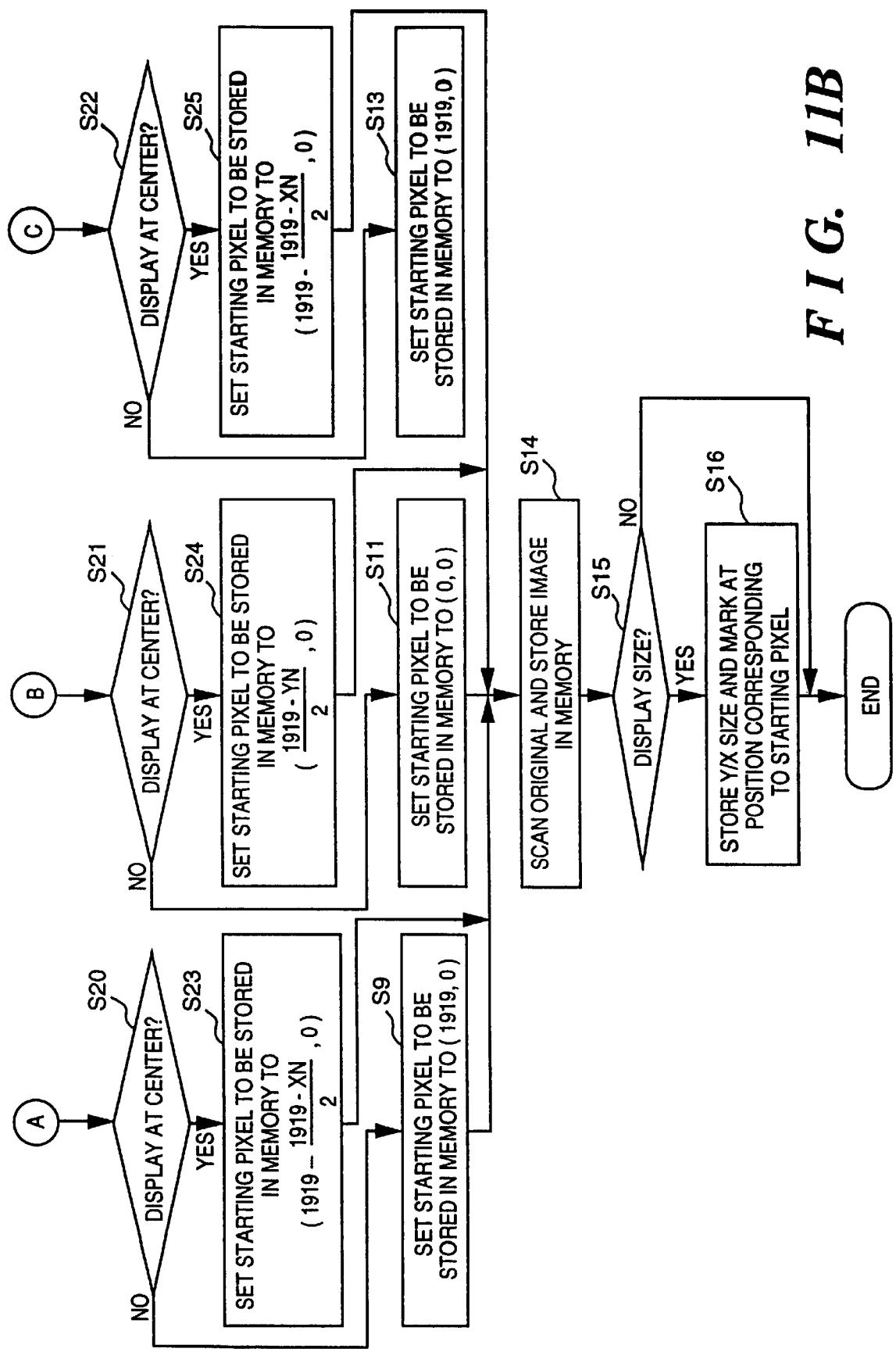
Figure 15C:
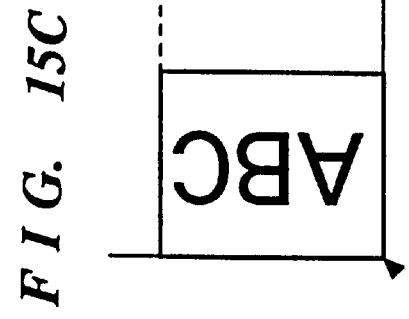
FIGS. 15A to 15C and 15A' and 15C' are explanatory views for explaining conventional preview processing.
Figure 15B:
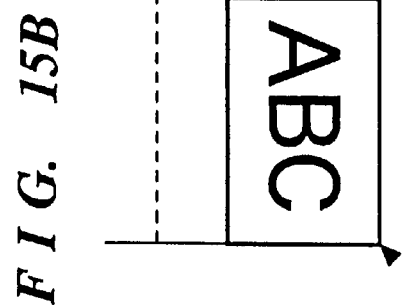
Figure 15A:
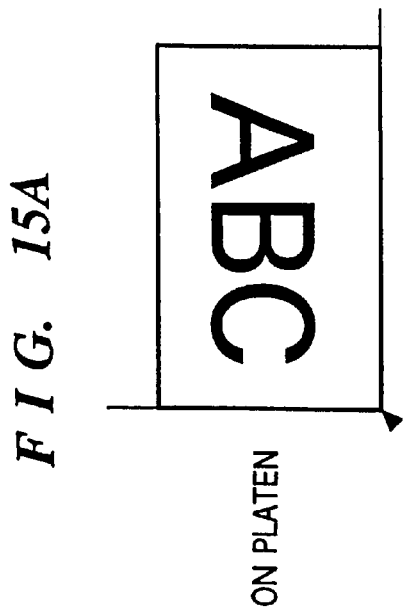
Figure 15C:
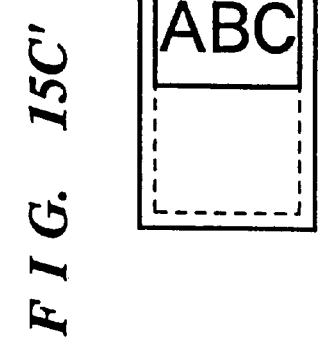
Figure 15B:
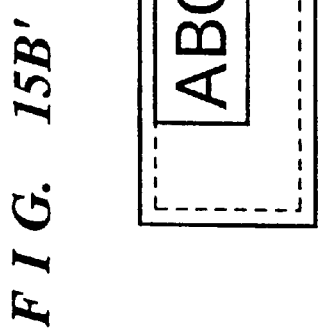
Figure 15A:

FIGS. 11A and 11B show flowcharts of a preview processing according to the second embodiment. In the flowcharts shown in FIGS. 11A and 11B, the steps at which the same processes as shown in FIG. 7 are performed are referred by the same reference numerals, and their explanations are omitted.

In advance of starting the preview processing, an operator designates a desired display state by using the switches 511 to 514 in the operating unit 300'.

Then, the preview processing is started by pressing the preview key 510 on the operating unit 300' before the start key 506 for instructing to start copying is pressed.

After performing the processes at steps S1 to S7, a flag for instructing to perform a rotation process and a compression ratio N are set at steps S8, S10, or S12. Thereafter, display position control, the feature of the second embodiment, is performed. The details of the display position control will be described below.

First, when the process at step S10 is completed, then the process proceeds to step S21. At step S21, whether a preview image is to be displayed at the center of the display screen or in the side are determined. More particularly, the display position designated by the switch 514 is determined.

Then, as a result of the determination at step S21, if the center is designated to display the preview image, the process moves to step S24, where the starting pixel (L0, M0) from which an image is stored in the image memories 82R, 82G, and 82B, is set to ((1919-YN)/2, 0). In contrast, when the switch 514 designates to display in the side, then the process proceeds to step S11, where the starting pixel (L0, M0) is set to (0, 0), as shown in FIG. 5B.

Furthermore, when the process at step S8 is completed, then the process goes to step S20. At step S20, if the switch 514 designates to display at the center as in the case of aforesaid step S21, the process proceeds to step S23, where the starting pixel (L0, M0) from which an image is stored in the image memories 82R, 82G, and 82B, is set to (1919−(1919-XN)/2, 0). Whereas, when the switch 514 designates to display in the side, then the process proceeds to step S9, where the starting pixel (L0, M0) is set to (1919, 0), as shown in FIG. 5E.

Further, after the process at step S12 is completed, the process goes to step S22, where the designation by the switch 514 is determined as in the steps S20 and S21. Then, if the switch 514 indicates to display at the center, the starting pixel (L0, M0), from which an image is stored in the image memories 82R, 82G, and 82B is set to (1919−(1919-XN)/2, 0). Whereas, when the switch 514 designates to display in the side, the starting pixel (L0, M0) is set to (1919, 0).

As described above, by suitably setting the starting pixel (L0, M0) from which an image is stored in the image memories 82R, 82G, and 82B in accordance with the designation by the switch 514, the preview image displayed on the CRT 301 is moved to a position which the operator desires.

Note, the processes after step S14 are the same as those in the aforesaid first embodiment.

According to the second embodiment as described above, a preview image can be displayed in the most effective size and at the operator's desired position on the image display area of the CRT 301.

FIGS. 12A to 12F show examples of preview images on the display screen in the second embodiment. FIGS. 12A to 12F show examples of preview images on the CRT 301 in a case where pretty big empty space is displayed upon displaying a preview image of an original on the CRT 301.

FIGS. 12A and 12D are examples of preview images displayed in accordance with the starting pixels set at step S11 shown in the flowcharts in FIG. 11B. Further, FIG. 12B is an example of a preview image displayed as a result of the steps S23, S24, and S25. Furthermore, FIG. 12C is an example of a preview image displayed in accordance with the starting pixel set at steps S9 and S13.

FIGS. 12A to 12D show examples when M0 of the starting pixel (L0, M0) from which an image is written to the memories is a fixed value, "0", and can be realized by following the aforesaid flowchart. However, the second embodiment is not limited to these, and preview images shown in FIGS. 12E and 12F can be obtained by making the M0 variable, for example.

Further, when a preview image is displayed in the side, it is possible to limit the display position to. either the right side or the left side by setting the starting pixel (L0, M0) properly.

According to the second embodiment as described above, it becomes possible-to display a preview image at an operator's desired position, e.g., a center of the display screen, thus more efficient image display can be achieved.

<Third Embodiment>

The third embodiment of the present invention is described below.

In the first embodiment, a case where the printing unit 28 comprises a single electrostatic drum thus an image signal outputted to the printing unit 28 is a frame sequential signal by each color is explained. In the third embodiment, a case where the present invention is applied to a printing unit comprizing four electrostatic drums will be described.

A block diagram illustrating a configuration of a color copying machine according to the third embodiment is shown in FIG. 13. In FIG. 13, the same units and elements as those in the first embodiment are referred by the same reference numerals, and their explanation are omitted. In FIG. 13, YMC density signals are corrected by a printer color correction unit 91 in accordance with the spectral reflectance characteristics of color recording materials used in a printing unit 93. Further, four signals of YMC and K (black) are outputted in parallel in accordance with the number of drums provided in the printing unit 93. Then, an image editorial unit 92 processes the signals of the four colors in parallel, and outputs the processed signals to the printing unit 93 as well as outputs signals of three colors, Y, M, and C, to a preview controller 94.

In the printing unit 93, because there are physical distances between the drums, each signal is properly delayed so as to ajust timing, and images of different colors are printed on a recording paper sheet in synchronization with a conveyance speed.

The detailed configuration of the preview controller 94 in the third embodiment is almost the same as that shown in FIG. 4 in the first embodiment, except that the input density signal 27YMC in FIG. 4 is replaced by independent density signals, 92Y, 92M, 92C, inputted into an inverse-logarithmic converter 85 via three independent signal lines in the third embodiment.

Therefore, according to the third embodiment, an edited image can be displayed at the same timing as shown in FIG. 6B in the first embodiment. More specifically, YMC signals of a scanned image can be stored simultaneously, not frame sequentially, thus a preview image can be displayed only after one scanning process, thereby processing time can be shortened.

<Fourth Embodiment>

A fourth embodiment of the present invention is described below.

In the aforesaid third embodiment, a K signal is outputted after the printer color correction unit 91 shown in FIG. 13 processes a known under color removal (UCR). As a result, when the signals 92Y, 92M, and 92C are directly outputted to the preview controller 94 in the third embodiment, since the UCR is already performed on the signals, a gray part of an image is expressed in thinner color than the color of an actually printed image. Thus, a best preview image can not be displayed on the CRT 301.

Accordingly, in the fourth embodiment, when the sensor 21 is performing pre-scanning for a preview processing, the UCR is set so as not to be performed in the printer color correction unit 91, whereas, when a general scanning for outputting an image on a recording paper sheet is performed after completing the preview display, the UCR is set to be processed.

According to the fourth embodiment as described above, a preview image which has close resemblance to an output image can be displayed.

<Fifth Embodiment>

A fifth embodiment of the present invention is described below. A configuration of an apparatus according to the fifth embodiment is the same as that in the aforesaid first embodiment, thus its explanation is omitted. However, a block diagram showing flows of image signals shown in FIG. 3 in the first embodiment is different from that of the fifth embodiment. The block diagram according to the fifth embodiment is shown in FIG. 14.

In the first embodiment, an example that a numeral value showing an image size and a reference position mark are synthesized with an preview image to be displayed on the CRT 301, stored in the image memories 82R, 82G, and 82B by the CPU 32 in order to show the image size and the reference position.

In the fifth embodiment, an additional memory 35 capable of storing data of one frame is provided in addition to the image memories of each color 82R, 82G, and 82B. Then, the size of an image and a reference position mark to be synthesized with the image are written in the additional memory 35 under control of the CPU 32. Then, the content of all the image memories 82R, 82G, and 82B, and the additional memory 35 are synthesized and displayed on the CRT 305.

According to the fifth embodiment, therefore, when a preview image is displayed on the CRT 301, if the starting position of image data to be read from the image memories 82R, 82G, and 82B is arbitrarily changed, the size of the image and the reference position mark are displayed on the fixed positions of the preview image, since they are stored at the fixed pixel positions in the additional memory 35 storing one whole frame. Accordingly, a preview image which is easy to see for an operator can be displayed, thereby good operability is achieved. Note that information other than the size of an image and a reference position mark can be also stored in the additional memory 35, of course. Further, the additional memory 35 does not always have to have capacity for storing data for one whole frame.

It should be noted that applications of the present invention to a color copying machine are explained in the aforesaid embodiments, however, the present invention is not limited to these. For example, especially the determination method for determining a display position of a preview image on-a display screen can be applied to a monochromatic image processing apparatus.

Further, the aforesaid embodiments explain a case where the CRT 301 for displaying a preview image is set on a copying machine main body. However, the copying machine can be connected to an external computer which executes an image processing via a predetermined interface and whose CRT displays a preview image. In this case, the image confirmed in the preview processing is sent back to the copying machine where the image is printed out.

<Other Embodiment>

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

According to the present invention as described in the above plurality of embodiments, by enabling to display a preview image after applying editorial processes to an original image, the preview image which has close resemblance to the edited image can be obtained. Furthermore, since the image data is automatically applied with displacement, magnification/compression, and rotation processes in accordance with the size of an image and the size of the display screen, the preview image can be displayed in the most effective size and in the desired direction for an operator.

Further, by displaying a preview image synthesized with the size of an image to be outputted and a reference position mark as magnification/compression and rotation processes is applied to the image, it becomes easy to check the size of the image and the up-and-down, and right-and-left directions.

Furthermore, it becomes possible to control a storage method for storing a preview image data on the basis of the size of an original image or the size of an output-image, thus it also becomes possible to generate a preview image on the basis of either the size of the original image or the size of the formed image.

Further, it becomes possible to display a preview image at the operator's desired position, e.g., at the center of the display screen, thus a good preview image display for the operator can be performed.

It should noted that, in the aforesaid embodiment, a preview image corresponding to an input original image is explained, however, the preview image of the present invention is not always corresponds to one whole page of the original. For example, in a case where an original includes a plurality of object images, each object image can be subjected to the previw processing.

The present invention is not limited to the above embodiments and various changes and modifications can be made within the spirit and scope of the present invention. Therefore to appraise the public of the scope of the present invention, the following claims are made.

What is claimed is:

1. An image processing apparatus comprising:
    a scanner for scanning an original image and generating image data;
    storage means for generating and storing preview image data corresponding to said image data;
    size detecting means for detecting a size of said original image;
    control means for controlling a storage method for storing said preview image data in accordance with the size of said original image;
    adding means for adding information, the information representing an orientation of said original image on said scanner, to said preview image data; and
    output means for outputting said preview image data and said information to a display device.

2. The image processing apparatus according to claim 1, further comprising editorial means for editing said image data,
    wherein said storage means generates and stores the preview image data corresponding to the edited image data.

3. The image processing apparatus according to claim 1, wherein said size detecting means detects sizes of said original image in the main scanning direction and in the sub-scanning direction, and said control means controls the storage method on the basis of the sizes of said original image in the main scanning direction and in the sub-scanning direction.

4. The image processing apparatus according to claim 3, wherein said control means controls so that said preview image data is rotated on the basis of the sizes of said original image in the main scanning direction and in the sub-scanning direction and the rotated preview image data is stored in said storage means.

5. The image processing apparatus according to claim 4, wherein said control means controls so that said preview image data is rotated when the size of said original image in the main scanning direction is larger than the size of said original image in the sub-scanning direction and the rotated preview image data is stored in said storage means.

6. The image processing apparatus according to claim 5, wherein an angle of said rotation is 90 degrees.

7. The image processing apparatus according to claim 3, wherein said control means controls the storage method on the basis of the sizes of the original image in the main scanning direction and in the sub-scanning direction and on a storage size of said storage means.

8. The image processing apparatus according to claim 7, wherein said control means controls so that said review image data is displaced and the displaced review image data is stored in said storage means.

9. The image processing apparatus according to claim 1, wherein said adding means adds information representing a size of the original image.

10. The image processing apparatus according to claim 1, further comprising image forming means for forming an output image corresponding to said image data on a recording medium,
    wherein said adding means adds information representing a size of the output image to be formed by said image forming means.

11. An image processing apparatus comprising:
    a scanner for generating image data by scanning an original image and detecting the size of the original image;
    setting means for setting the size of a recording medium in accordance with a user's instruction;
    image forming means for forming an output image corresponding to said original image on a recording medium having the size set by said setting means;
    mode selecting means for selecting a first mode for generating preview image data on the basis of the detected size of said original image or a second mode for generating preview image data on the basis of the set size of the recording medium, in accordance with user instruction; and generating means for generating preview image data representing a preview image corresponding to a selected mode.

12. The image processing apparatus according to claim 11 further comprising manual selecting means for selecting said first mode or said second mode by manual operation and for selecting a size of said recording medium.

13. An image processing method comprising the steps of:

scanning an original image by a scanner;

generating preview image data corresponding to scanned image data;

storing the preview image data in storage means;

detecting a size of said original image;

controlling a storage method for storing said preview image data in the storage means in accordance with the size of said original image;

adding information, the information representing an orientation of said original image on said scanner, to said preview image data; and outputting said preview image data and said information to a display device.

14. An image processing method which inputs image data representing an original image, detects the size of the original image, sets the size of a recording medium in accordance with a user's instruction, forms an output image corresponding to said original image on a recording medium having set size, selects a first mode for generating preview image data on the basis of detected size of said original image or a second mode for generating preview image data on the basis of set size of the recording medium, in accordance with user instruction, generates preview image data representing a preview image corresponding to selected mode.

15. An image processing apparatus comprising:

a scanner for scanning an original image and generating image data;

storage means for storing preview image data corresponding to said image data;

adding means for adding information, the information representing an orientation of said original image on said scanner, to said preview image data; and output means for outputting said preview image data and said information to a display device.

* * * * *

UNITED STATES PATENT AND TRADEMARK OFFICE
CERTIFICATE OF CORRECTION

PATENT NO. : 6,222,545 B1 Page 1 of 1
APPLICATION NO. : 08/621994
DATED : April 24, 2001
INVENTOR(S) : Yasumichi Suzuki et al.

It is certified that error appears in the above-identified patent and that said Letters Patent is hereby corrected as shown below:

COLUMN 2
  Line 67, "comprising:." should read --comprising:--.

COLUMN 5
  Line 31, "(B)" should read --(B).--.

COLUMN 8
  Line 37, "27YMC" should read --27YMC.--.

COLUMN 10
  Line 51, "images-on" should read --images on--.

COLUMN 12
  Line 63, "to." should read --to--; and
  Line 67, "possible-to" should read --possible to--.

COLUMN 14
  Line 43, "on-a" should read --on a--.

COLUMN 15
  Line 37, "output-image," should read --output image,--.

COLUMN 17
  Lines 4 to 7, Claim 12 should be deleted.

Signed and Sealed this

Fourteenth Day of November, 2006

JON W. DUDAS
*Director of the United States Patent and Trademark Office*